E. S. AND R. C. HOGSHEAD.
TIRE CHAIN.
APPLICATION FILED OCT. 4, 1921.
1,409,296.
Patented Mar. 14, 1922.
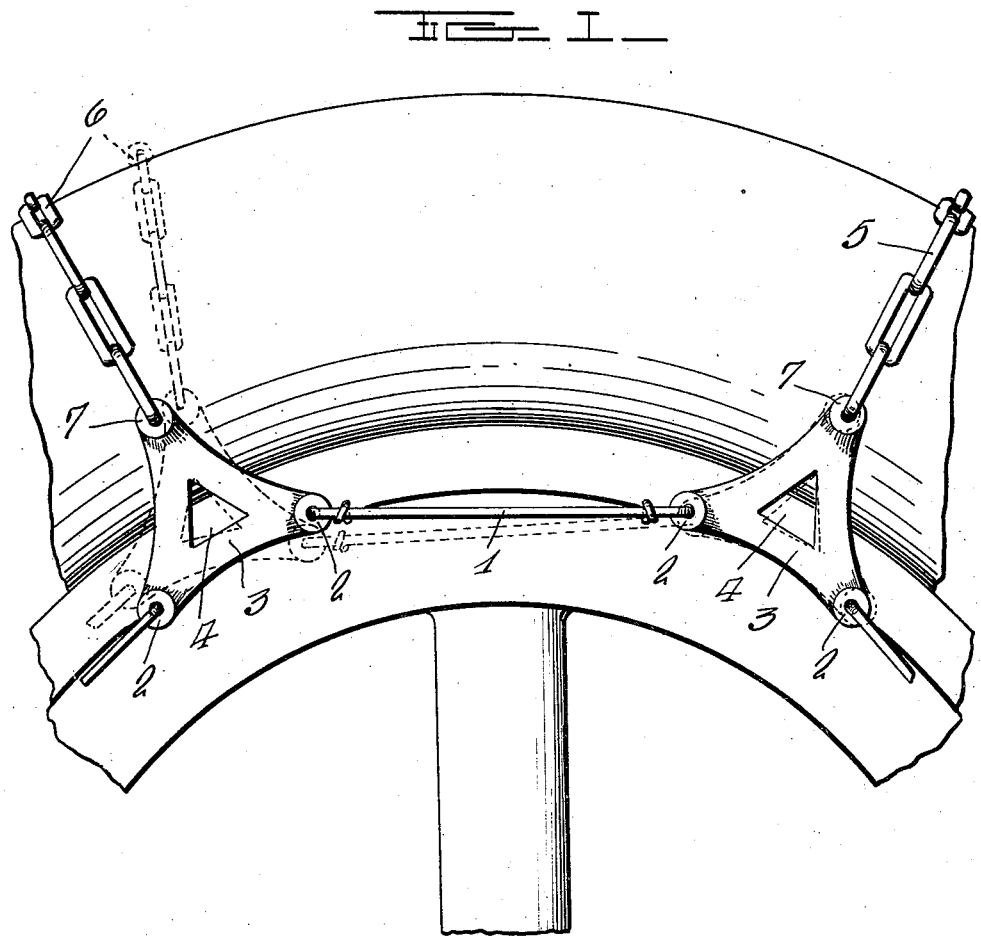
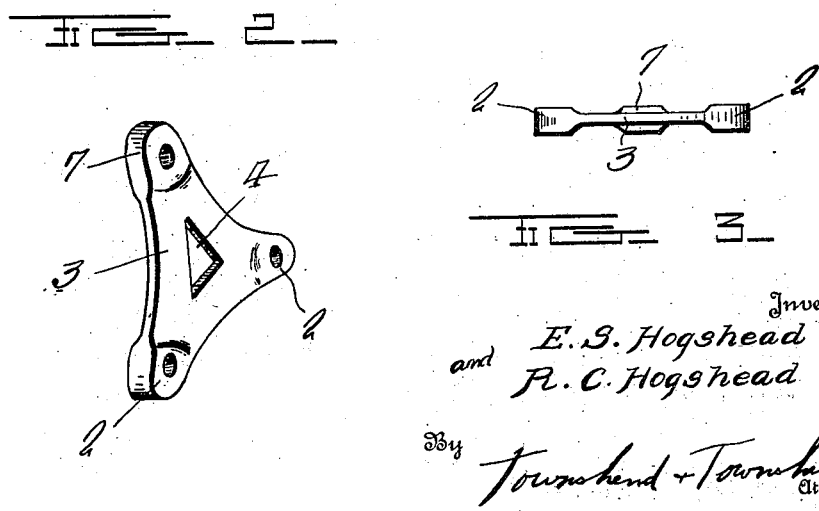
Inventors
E. S. Hogshead
and R. C. Hogshead
By Townshend + Townshend
Attorneys

UNITED STATES PATENT OFFICE.

EDGAR S. HOGSHEAD, OF MOUNT SOLON, AND RODNEY C. HOGSHEAD, GORDONSVILLE, VIRGINIA.

TIRE CHAIN.

1,409,296.        Specification of Letters Patent.     Patented Mar. 14, 1922.

Application filed October 4, 1921. Serial No. 505,314.

*To all whom it may concern:*

Be it known that we, EDGAR S. HOGSHEAD and RODNEY C. HOGSHEAD, citizens of the United States, residing, respectively, at Mount Solon and Gordonsville, in the counties of Augusta and Orange and State of Virginia, have invented certain new and useful Improvements in Tire Chains, of which the following is a specification.

Our invention relates to tire chains and the primary object thereof is the provision of a chain which will effectively prevent skidding of the wheel to which the same is applied, and which will automatically bind upon the tire, eliminating any possibility of the chain slipping relative to the periphery of the wheel.

Another object of the invention is to provide in a tire chain means for automatically binding the chain on the tire.

With these and such other objects in view as will be apparent from the description, the invention resides in the novel combination, construction and arrangement of parts hereinafter described and claimed, and taken in connection with the accompanying drawings, of which—

Figure 1 is an elevation of a part of the wheel and tire equipped with our improved chain;

Fig. 2, a perspective of one of the chain members employed; and

Fig. 3, an end elevation of the members shown in Figure 2.

In detail, the chain comprises link members 1, formed of heavy steel wire, in this preferred form of the invention, the ends of the wires forming the links being bent upon themselves to pass through and be secured in enlarged eyes 2, formed at the apexes of triangular side pieces 3. The side chain proper comprises a plurality of the links 1 connected by the side members 3, as illustrated in Figure 1, said links and side members being disposed adjacent the rim of the wheel as in the ordinary manner of chains now in use.

The side members 3 are formed preferably of pressed steel, approximately in the shape of an equilateral triangle, with the apexes 2 being enlarged for strengthening the connection with the link members 1, and having their central portions cut away as illustrated at 4. Cross chains 5 are secured to the upper apexes of each side member 3, and extend across the tread of the tire to connect with similar side members disposed on the opposite side, as will be understood.

It has been found that a serious defect exists with the chains now in use by reason of the fact that under certain conditions the chain will slip around the periphery of the tire, which is not only injurious to the tire tread, but results in a loss of power and is very often the cause of vehicles being unable to pull out of mud holes and the like. With our improved chain this defect has been absolutely overcome by reason of the fact that as the cross chains 5 are carried backward on the tire, to the dotted line position as shown at 6, the upper apexes 7 of the members 3 will be moved rearwardly thereby throwing the lower apexes to the dotted line positions as shown in Figure 1, whereby the side members will in effect be fulcrumed against the rim of the wheel and the links 1 will be automatically drawn closer to provide for a tightening of the entire chain relative to the periphery of the tire.

While we have shown and described certain details and materials which enter into the construction and operation of our invention, we desire it to be understood that we do not intend to limit ourselves to these, but any such may be used as will fall within the scope of the invention as claimed.

We claim:

In a tire chain of the character described, the combination with side chains formed of links of rigid steel wire disposed at opposite sides of a tire and below the same adjacent the rim on which the tire is carried, of equilateral triangular shaped metal members connecting the ends of said links at spaced intervals, said members having cut away central portions and flat arms forming the sides, the apexes of said members being thickened in cross section and provided with eyes, one pair of which eyes are adapted to receive the ends of said links for pivotal connection, and the other of said eyes being adapted to receive cross chains connecting the side chains across the tire, whereby movement of said cross chains will actuate said members to tighten the side chains.

In testimony whereof we affix our signatures.

EDGAR S. HOGSHEAD.
RODNEY C. HOGSHEAD.